US012755913B1

(12) United States Patent
Abere et al.

(10) Patent No.: US 12,755,913 B1
(45) Date of Patent: Oct. 6, 2026

(54) IRREVERSIBLE, NORMALLY CLOSED, SOLID-STATE THERMAL SWITCH

(71) Applicant: National Technology & Engineering Solutions of Sandia, LLC, Albuquerque, NM (US)

(72) Inventors: Michael J K Abere, Albuquerque, NM (US); David P. Adams, Albuquerque, NM (US); Matthew W. Moorman, Albuquerque, NM (US); Rick A. Kellogg, Albuquerque, NM (US); Richard Joseph Gallegos, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 245 days.

(21) Appl. No.: 18/773,712

(22) Filed: Jul. 16, 2024

Related U.S. Application Data

(60) Provisional application No. 63/529,833, filed on Jul. 31, 2023.

(51) Int. Cl.
*H01H 37/76* (2006.01)
*H01H 37/32* (2006.01)

(52) U.S. Cl.
CPC .......... *H01H 37/761* (2013.01); *H01H 37/32* (2013.01)

(58) Field of Classification Search
CPC ........... H01H 37/32; H01H 37/74-761; H01H 2037/768; H01H 85/06
See application file for complete search history.

(56) References Cited

U.S. PATENT DOCUMENTS 5,905,590 A * 5/1999 Van Der Sluis ...... G02F 1/1523 359/275
6,101,298 A * 8/2000 Den Broeder ............ G02F 1/17 385/16
6,173,116 B1 * 1/2001 Roozeboom ........ H10P 72/0436 219/390

OTHER PUBLICATIONS

Abere, M. J. et al., "Normally closed thermally activated irreversible solid state erbium hydride switches," Micro and Nano Engineering, 2024, vol. 23, 100243.
Manginell, R. P. et al., "Two-Dimensional Modeling and Simulation of Mass Transport in Microfabricated Preconcentrators," IEEE Sensors Journal, 2007, vol. 7, pp. 1032-1041.
Manginell, R. P. et al., "Mass-Sensitive Microfabricated Chemical Preconcentrator," Journal of Microelectromechanical Systems, 2007, vol. 17, pp. 1396-1407.

* cited by examiner

*Primary Examiner* — Jacob R Crum
(74) *Attorney, Agent, or Firm* — Kevin W. Bieg

(57) ABSTRACT

An irreversible, normally closed, solid-state thermal switch is comprised of a rare-earth metal hydride thin film that can be integrated to an on-board microheater for switch actuation. The active metal hydride switch material undergoes a thermodynamically stable reduction-oxidation (REDOX) reaction leading to a multi-decade change in resistance. The switched state is maintained when the device is cooled back to room temperature, meaning the switch is irreversible and suitable as a thermal fuse. The nature of the REDOX-based approach to thermal switching is also suitable for passive operation in thermal environments.

5 Claims, 8 Drawing Sheets

IRREVERSIBLE, NORMALLY CLOSED, SOLID-STATE THERMAL SWITCH

CROSS-REFERENCE TO RELATED APPLICATION

This application claims the benefit of U.S. Provisional Application No. 63/529,833, filed Jul. 31, 2023, which is incorporated herein by reference.

FEDERALLY SPONSORED RESEARCH AND DEVELOPMENT

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): Michael J. Abere, Richard J. Gallegos, Matthew W. Moorman, Mark A. Rodriguez, Paul G. Kotula, Rick A. Kellogg, and David P. Adams, "Normally closed thermally activated irreversible solid state erbium hydride switches," *Micro and Nano Engineering* 23, 100243 (2024). The subject matter of this disclosure was conceived of or invented by the inventors named in this application.

BACKGROUND OF THE INVENTION

Solid-state switches are a mainstay of modern electronic devices. The switches can be made of either inorganic or organic materials. See M. Wuttig et al., *Nat. Photon.* 11(8), 465 (2017); J. Isaksson et al., *Adv. Mater.* 16(4), 316 (2004); and G. R. Wilson et al., *Angew. Chem.* 135, 08715 (2023). Switches can be triggered optically, electrically, magnetically, or thermally. See M. Wuttig et al., *Nat. Photon.* 11(8), 465 (2017); Y. H. Luo et al., *J. Mater. Chem. A* 11(3), 1232 (2023); K. Zangeneh Kamali et al., *Light Sci. Appl.* 12(1), 40 (2023); A. Asamitsu et al., *Nature* 388(6637), 50 (1997); and C. Hillman et al., "An ultra-low loss millimeter-wave solid state switch technology based on the metal-insulator-transition of vanadium dioxide," in *Proc. IEEE MTT-S Int. Microw.,* 1 (2014). Solid-state switches have a reliability advantage over switches that rely on a solid-liquid phase change because solidification itself is nondeterministic. See D. M. Stefanescu and H. Pang, *Can. Metall. Q.* 37(3-4), 229 (1998). For similar reliability reasons, solid-state switches have garnered attention as replacements for traditional mechanical switches and paraffin-based spring switches due to their lack of moving parts. Solid-state switches, including those that function over nanoscale vacuum gaps, have also been explored as replacements to thermal switches that rely on making and breaking conductive contact. See L. Zhu et al., *Appl. Phys. Lett.* 100(4), 044104 (2012); Y. Yang et al., *J. Quant. Spectrosc. Radiat. Transf.* 158, 69 (2015); S. Whalen et al., *Sens. Actuators A: Phys.* 104(3), 290 (2003); and J. Cho et al., *Sens. Actuators A: Phys.* 133(1), 55 (2007). The switches can be categorized by whether they are normally open/closed, range of state resistance, and reversibility.

Interest in irreversible, normally closed, solid-state switches is centered around their reliability advantage over a traditional, physically discontinuous fuse because they are not subject to rewelding conductive pathways over time from debris and metal shards. One way in which fuse reliability has been previously addressed has been with a type of solid-state switch known as an "electrical fuse," which employs the electromigration of material to increase resistance. See C. Kothandaraman et al., *IEEE Electron Device Lett.* 23(9), 523 (2002); C. Tian et al., "Reliability qualification of CoSi2 electrical fuse for 90 nm technology," in *Proc. IEEE Int. Reliab. Phys. Symp.,* 392 (2006); and H. Kim et al., *Curr. Appl. Phys.* 49, 127 (2023). These electrical fuses have seen application in one-time programmable memory. See Y. K. Kim et al., *J. Cent. South Univ.* 19(12), 3484 (2012). Unlike a traditional fuse, the high resistance state of electrical fuses (effuses) exhibits a statistical distribution of final resistances and can be centered about 1-3 orders of magnitude above the conductive state, depending on device design. See N. Robson et al., "Electrically programmable fuse (efuse): From memory redundancy to autonomic chips," in *Proc. IEEE Cust. Integr. Circuits Conf.,* 799 (2007). The observed variance in electrical fuse end state resistance originates from void formation during electromigration. See D. K. Kim et al., *J. Appl. Phys.* 103(7), 073708 (2008); and J. Park et al., "Phase transformation of programmed NiSi electrical fuse: Diffusion, agglomeration and thermal stability," in *Proc. IEEE Int. Symp. on the Phys. and Fail. Anal. of Integr. Circuits,* 1 (2011). Another class of normally closed, solid-state switches involves integrating diodes or transistors with a gate driver, cooling system, voltage clamping circuits, fault sensing system, sense/trip electronics, and an external power supply to produce solid-state circuit breakers. See R. Rodrigues et al., *IEEE Trans. Power Electron.* 36(1), 364 (2020). These devices hold the additional advantage over mechanical breakers of rapid, sub-μs switching times. However, neither refuses nor solid-state circuit breakers are suitable for operation in elevated temperature environments.

While many materials are capable of changing resistivity upon heating, design constraints such as high contrast ($\geq 10^6$) and high operating temperature (>100° C.) remain difficult to simultaneously achieve. This difficulty is exacerbated by the fact that materials thermodynamically become more ordered upon heating, which changes electrical conductivity from a low to high state. See M. Wuttig et al., Nat. Photon. 11(8), 465 (2017); K. M. Chung et al., *J. Appl. Phys.* 103(8), 083523 (2008); and M. Zhu et al., *Appl. Phys. Lett.* 100, 122101 (2012). An amorphous to crystalline transition has been long studied in the chalcogenides such as GeSbTe. See M. Wuttig et al., *Nat. Photon.* 11(8), 465 (2017); P. Guo et al., *App. Sci.* 9(3), 530 (2019); and S. Barzegar-Parizi et al., *Appl. Phys. A: Mater. Sci. Process,* 129(11), 790 (2023). Utilizing the insulator-to-metal transition in $VO_x$ also produces a closing of the switch material with increasing temperature. See J. Paras et al., *Phys. Rev. B* 102(16), 165138 (2020); C. Hillman et al., "An ultra-low loss millimeter-wave solid state switch technology based on the metal-insulator-transition of vanadium dioxide," in *Proc. IEEE* MTT-S Int. Microw., 1 (2014); and D. J. Lahneman et al., *npj Quantum Mater.* 7(1), 72 (2001). Other metal oxides, such as MnOx, undergo a metal-to-insulator transition upon heating and have been integrated into irreversible, normally closed switches capable of 8 orders of resistance contrast. See R. Ramesham et al., J. Vac. Sci. *Technol. B: Nanotechnol. Microelectron.* 7(3), 450 (1989). However, the MnOx-based switches require a "forming" voltage to be maintained on the material to keep the oxide at a sub-stoichiometric $MnO_{2-\Delta}$ to function. A physical mechanism capable of taking a material from a conductive to a resistive state upon heating is the replacing of metallic with covalent bonds that occurs during reduction/oxidation (REDOX) reactions. One such REDOX reaction is the thermally induced formation of $SiO_2$ at an indium-tin-oxide/p-silicon interface which is responsible for the degradation of solar cells. See S. M. Goodnick et al., J. *Appl. Phys.* 51(1), 527 (1980). While the reaction can produce high contrast between the semiconductor stack and product $SiO_2$, the specific reaction is not suitable for a thermal fuse because oxide growth is limited to the order of ~2 nm on a timescale of hours at 420° C. See H. Bartzsch et al., *Surf. Coat. Technol.* 174, 774 (2003); and S. M. Goodnick et al., *J. Appl. Phys.* 51(1), 527 (1980). Also ineffective as a candidate switch material is any REDOX reaction that produces a conductive elemental metal as a reaction product or those that are sufficiently exothermic to cause melting and/or boiling. See S. Fischer and M. Grubelich, "A survey of combustible metals, thermites, and intermetallics for pyrotechnic applications," in 32*nd Joint Propulsion Conference and Exhibit* (1996).

A material system that undergoes a REDOX reaction without exothermically melting/boiling or producing a conductive byproduct is metal hydrides. These materials have previously been utilized as reversible optical switches where great care is taken to avoid atmospheric oxygen and the resulting REDOX reaction. See J. N. Huiberts et al., *Nature* 380(6571), 231 (1996); V. A. Maiorov, Opt. Spectrosc. 128, 148 (2020); and J. L. Slack et al., *Sol. Energy Mater*. Sol. 90(4), 485 (2006). This class of materials has thermal stability over 100° C. determined by the material reduction temperature. See J. W. Sheffield et al., "Electricity and hydrogen as energy vectors for transportation vehicles," in *Alter. Fuel. Advan. Vehicle Technol. Impro. Environ. Perform.*, Woodhead Publishing, Sawston, UK, pp. 117-137 (2014). Moreover, strong covalent bonding in the resulting metal oxides makes them effective insulators.

SUMMARY OF THE INVENTION

The present invention is directed to an irreversible, normally closed, solid-state thermal switch, comprising a rare-earth metal hydride thin film disposed between two electrodes, and a heat source configured to heat the rare-earth metal hydride thin film to a transformation temperature, whereby the rare-earth metal hydride is at least partially transformed from an electrical conductor to an electrical insulator. For example, the heat source can be an active, on-board micro-heater or thermal environment subject to a temperature change, as caused by a fire for example.

BRIEF DESCRIPTION OF THE DRAWINGS

The detailed description will refer to the following drawings, wherein like elements are referred to by like numbers.

DETAILED DESCRIPTION OF THE INVENTION

The invention is directed to an irreversible, normally closed solid-state switch (i.e., thermal fuse) that can be driven into an open state when the metal hydride switch material activated by a micro-heater. As an example, the invention can use metal hydride thin film switch materials, interconnects, and on-board, micro-scale heaters for switch actuation. The micro-scale heaters can comprise serpentine resistive heaters built on to the back side of a silicon wafer for thermal actuation of switch materials on the front side of the wafer. The thin film switch material can be deposited on the front side of the wafer and connected to electrodes. Rapid, local heating (~10° C./ms) can actuate the switch material. Transition metal hydride or rare-earth metal hydride switch materials can be used to provide normally closed switches. The metal hydride switch material undergoes an irreversible thermodynamically stable phase change when heated to a transformation temperature, and the new state is characterized by a multi-decade change in resistivity that is maintained when cooled to room temperature. As an example, $ErH_3$ films convert to insulating $Er_2O_3$ films upon heating to ~300° C. in air, exhibiting a greater than 11-decade change in resistivity.

Thermal Switch Fabrication

Integration of active materials with switch devices requires the pre-fabrication of on-board heaters, electrodes, and interconnects on a substrate. As an example, micro-heaters can provide a thermal pulse to actuate switch materials. As such, the devices require metallization that can supply sufficient amperage for heater actuation. Additionally, electrodes and metallization are needed to connect switch materials. The electrodes make contact to the switch material to provide a conductive path for signal transmission.

Figure 1A:
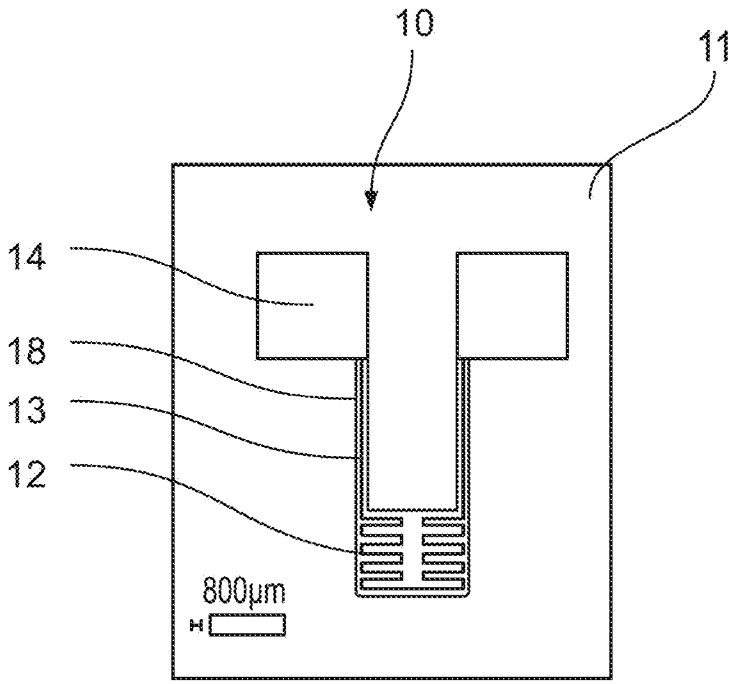
FIG. 1A is an illustration of the backside of a switch showing a serpentine patterned heater.
Figure 1B:
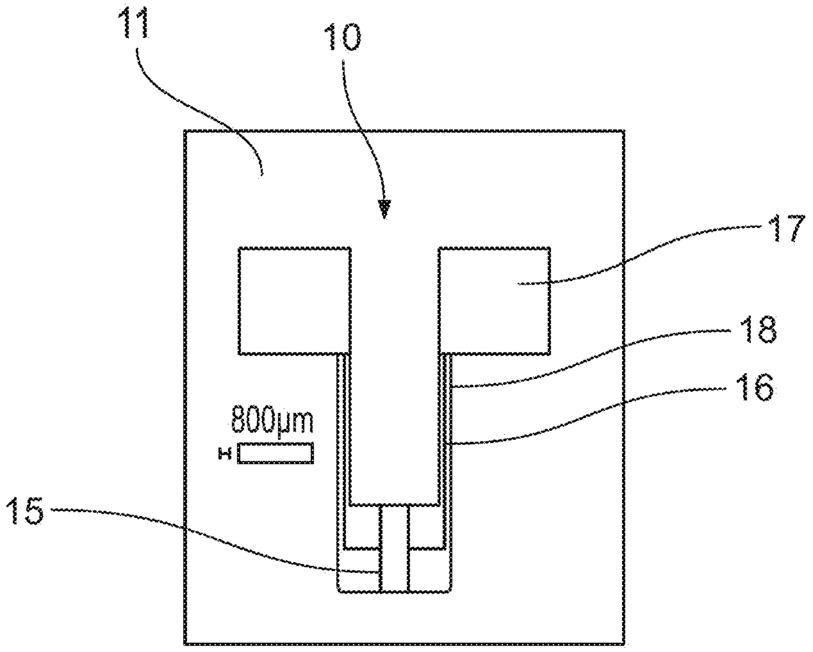
FIG. 1B is an illustration of the frontside of the switch showing parallel electrodes prior to switch material deposition.

Exemplary micro-heater designs were based on prior work by Manginell et al., as shown in FIGS. 1A and 1B. See R. P. Manginell et al., *IEEE Sens. J.* 7, 1032 (2007); and R. P. Manginell et al., *J. Microelectromechanical Syst.* 17, 1396 (2008). Switches 10 were fabricated by patterning an oxidized Si wafer 11 on both sides. On the back side, as shown in FIG. 1A, heaters 12 were fabricated along with their power lines 13. Heaters were made in a serpentine geometry with power supply lines 13 traced to bond pads 14 for external connection. The front side of the wafer 11 contained the parallel electrode 15, interconnect structure 16, and bond pads 17, as shown in FIG. 1B prior to switch material deposition. Each heater/switch pair was registered in plane, meaning that an individual heater would address only one switch during operation. Each switch was cantilevered from the substrate 11 to prevent heat loss to the substrate. Heating of the switch material occurs primarily via thermal conduction from the heater on the back side through the Si wafer to the switch structure on the front side.

Si wafers, 200 mm in diameter, 700 μm thick, and double side polished were used to fabricate the exemplary thermal switches. This substrate was chosen because it is inert, meaning that oxidized silicon largely avoids substrate-film intermixing or reaction when baked to elevated temperatures. The fabrication process started with a 400 nm thermal oxide grown on both sides of the Si wafer using a conventional steam oxidation furnace. E-beam metallization was used to deposit the switch electrical contacts on the front side, the meander heating element on the back side, and the wire-bond pads on the oxide layers. The metal heater elements and the switch electrical contacts consisted of 300 nm Pt on a 20-30 nm Ti adhesion layer. The wire-bond pads were a stack of 20/150/500 nm thick Ti/Pt/Au. All metallization was defined using conventional photoresist lift-off processes.

Deep-reactive-ion etching (DRIE) was used to produce the cantilevered micro-heater structure and the thermal isolation features. This suspended cantilever structure limits the thermal conduction from the switch to the bulk die and thus eliminates potential thermal cross-talk between adjacent switch structures. DRIE was performed from both sides of the wafer to reduce overall structural tapering as the etch progressed through the wafer thickness. To protect the metallized features and pattern the cantilever shape during the DRIE process, a 30-mm thick AZ 40XT resist was used as an etch mask. Etch rate calibrations were completed to avoid over etching and etch mask penetration. The etched features 18 around the inside and outside of the cantilevered structure are shown in FIGS. 1A and 1B. Additional margin was provided around Pt metal lines to avoid etch attack of metal line edges during wafer etching. After etching, individual switches were obtained via die singulation of the wafer with a dicing saw. Dicing did not result in mechanical breakage due to the full-wafer thickness of the cantilever struts. The heater die were attached and ribbon bonded to a printed board for integrated switch characterization studies.

Figure 2:
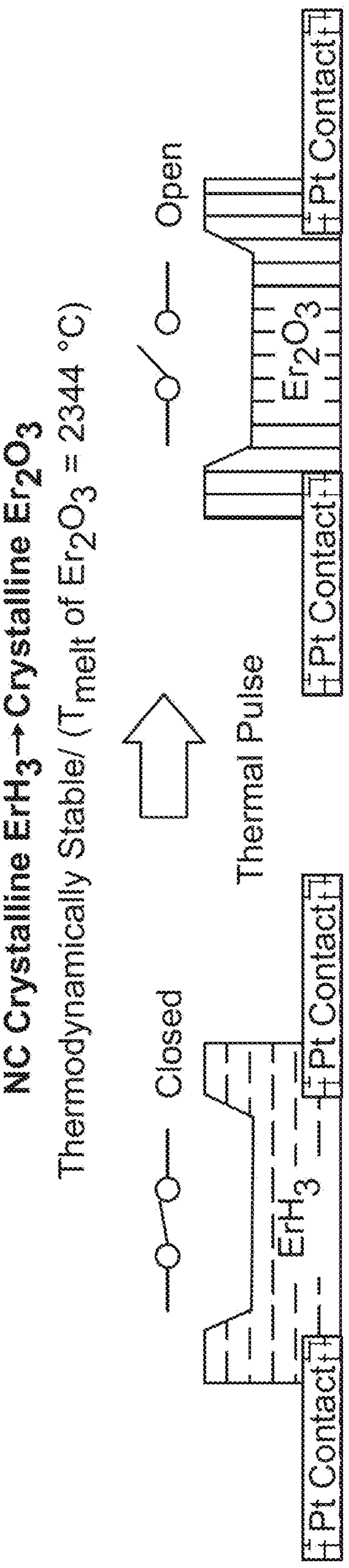
FIG. 2 is a schematic illustration of a normally closed $ErH_3/Er_2O_3$ thin film switch with Pt contacts before and after thermally activated switching.

Depositions for integrated switch materials used laser-machined shadow masks. The shadow masks isolated deposition to a 120 μm by 500 μm rectangle across the parallel plate electrode configuration on the front side of the switch shown in FIG. 1B. Thin film switch materials were deposited using direct current magnetron sputtering of the metal in a hydrogen atmosphere comprising a mixture of Ar with 3% $H_2$ as a reactive gas mixture. Working gas pressure was controlled in the range from 5-20 mTorr and was tuned to minimize film residual stress. Film thicknesses were varied within the range of 100 nm to 1000 nm. A schematic illustration of an exemplary switch material ($ErH_3$) bridging the parallel platinum electrodes and desired material transformation (to $Er_2O_3$) in response to a thermal pulse during electrical switching is shown in FIG. 2.

Materials Characterization

Metal hydrides are compounds comprising a metal cation bonded to one or more hydride anions. In particular, transition and rare-earth metal hydrides comprise a transition or rare-earth metal bonded to hydrogen, which often exhibit metal-like electrical conductivity and can form stable oxides by oxidation-reduction (REDOX) reactions. As examples of the invention, conductive $ErH_3$, $ScH_2$, and $TiH_2$ metal hydride thin films that undergo a REDOX reaction when heated in the presence of oxygen were investigated as normally closed switch materials. The composition of the metal hydrides was gauged mainly by the crystal structure shown by XRD. The hydrides have unique crystal structures compared to their pure metal making it possible to estimate stoichiometry. Films deposited to ~200 nm were confirmed to be hydride. Both the $ErH_2$ and $ErH_3$ stoichiometries are known to be stable in a cubic lattice due to high compressive stress created in sputtered films. See D. P. Adams et al., *Thin Solid Films* 520(19), 6145 (2012), However, measurements of the reversible hexagonal-to-cubic phase transition demonstrated that the lattice spacing observed in previous reports of sputter deposited films corresponded to an $ErH_3$ stoichiometry. See D. P. Adams et al., *Microstructures, Phase Formation, and Stress of Reactively-Deposited Metal Hydride Thin Films*, SAND2002-1466, (2002); and M. Tkacz and T. Palasyuk, *J. Alloys Compd.* 446, 593 (2007).

Previous publications pointed to hydrogen volatilization upon annealing, which was envisioned as a means to transform films as functional switches. See R. R. Wixom et al., *J. Appl. Phys.* 103, 123708 (2008). More specifically, metal hydrides will dissociate hydrogen at temperatures below 600° C., presenting opportunities for oxygen infiltration. See I. Gabis et al., *J. Alloys Compd.* 356, 353 (2003). Several of these metals form insulative oxides with $Er_2O_3$ being one of the most stable known.

Figure 3:
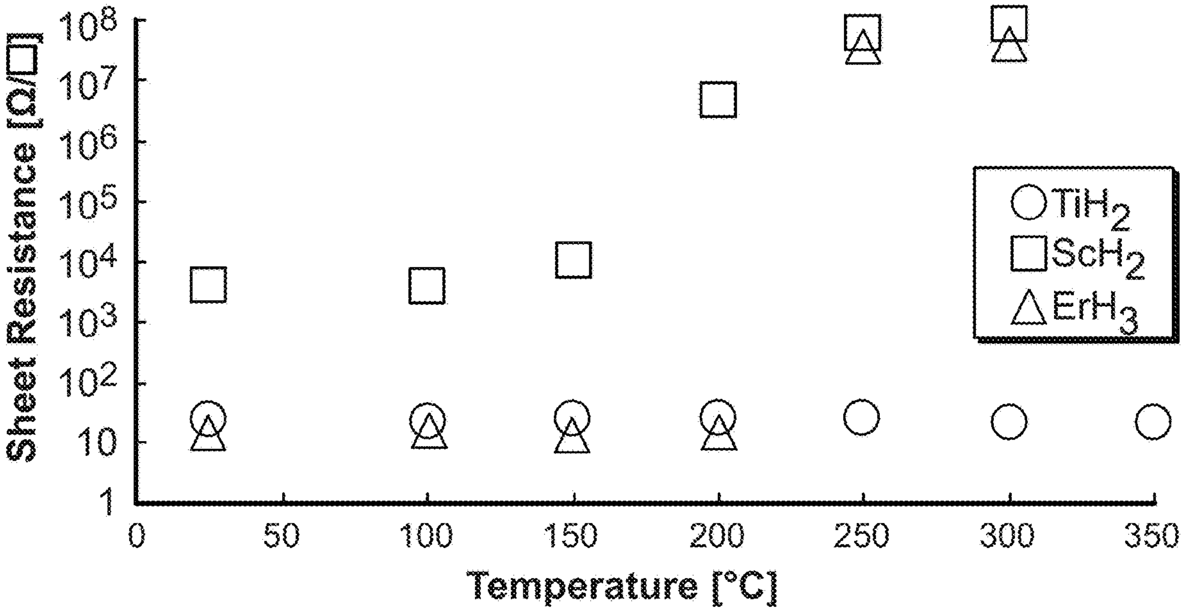
FIG. 3 is a graph of sheet resistance of furnace annealed metal hydride from four-point probe measurements.

To investigate electrical conductivity, metal hydride films were blanket deposited on fused silica substrates. The metal hydride films were annealed for 1 hr. in air to different temperatures and allowed to cool to room temperature. Four-point probe measurements of sheet resistance of the annealed films are shown in FIG. 3. $TiH_2$ films did not behave as a switch despite exhibiting a color change above 300° C. The $ScH_2$ films exhibited a four-decade change in sheet resistance with a gradual change in resistivity between 15° and 250° C.

$ErH_3$ exhibited the greatest resistance change, suggesting a better switch material compared with $ScH_2$ or $TiH_2$ films. Erbium trihydride films started with an initial sheet resistance of 15 Ω/square (resistivity, $\rho=1\times10^{-5}$ Ω-m). Heating to 250° C. and higher temperatures led to a six-decade increase in sheet resistance (measured after cooldown). Further, cracks and/or delamination were not observed in the reacted films when inspected with an optical microscope. This was not unexpected given that the volume change per Er atom between $ErH_3$ and $Er_2O_3$ is only 0.3-3.6%. See M. Tkacz and T. Palasyuk, *J. Alloys Compd.* 446, 593 (2007); and Q. Guo et al., *Inorg. Chem.* 46(15), 6164 (2007). This confirmed that changes in resistivity were associated with the intrinsic nature of the films. Therefore, rare-earth metal hydrides are preferred switch materials, as are very stable and convert uniformly to an insulating metal oxide stoichiometry (e.g., $M_2O_3$).

Additional tests were performed to better characterize the resistivity of the open state of $ErH_3$/$Er_2O_3$ switches. Films with a thickness=0.75 μm were deposited onto a 3.5 mm length by 9 mm width test die and measured for starting resistance (average being 5Ω). Based on the known geometry, it was confirmed that the low starting resistivity, $\rho\sim1\times10^{-5}$ Ω-m, was consistent with previous measurements of blanket films. Samples were then baked in air to 350° C. and held for 15 min to ensure extensive transformation to $Er_2O_3$. The sample exhibited a color change that may be associated with oxide. Next, the coated die were placed into a parallel circuit configuration with a 10 MΩ resistor. The open state switch was determined to have ρ=56 MΩ-m. From these measurements, it is established that the $ErH_3$/$Er_2O_3$ transformation exhibits a 12-decade change in resistivity.

Figure 4:
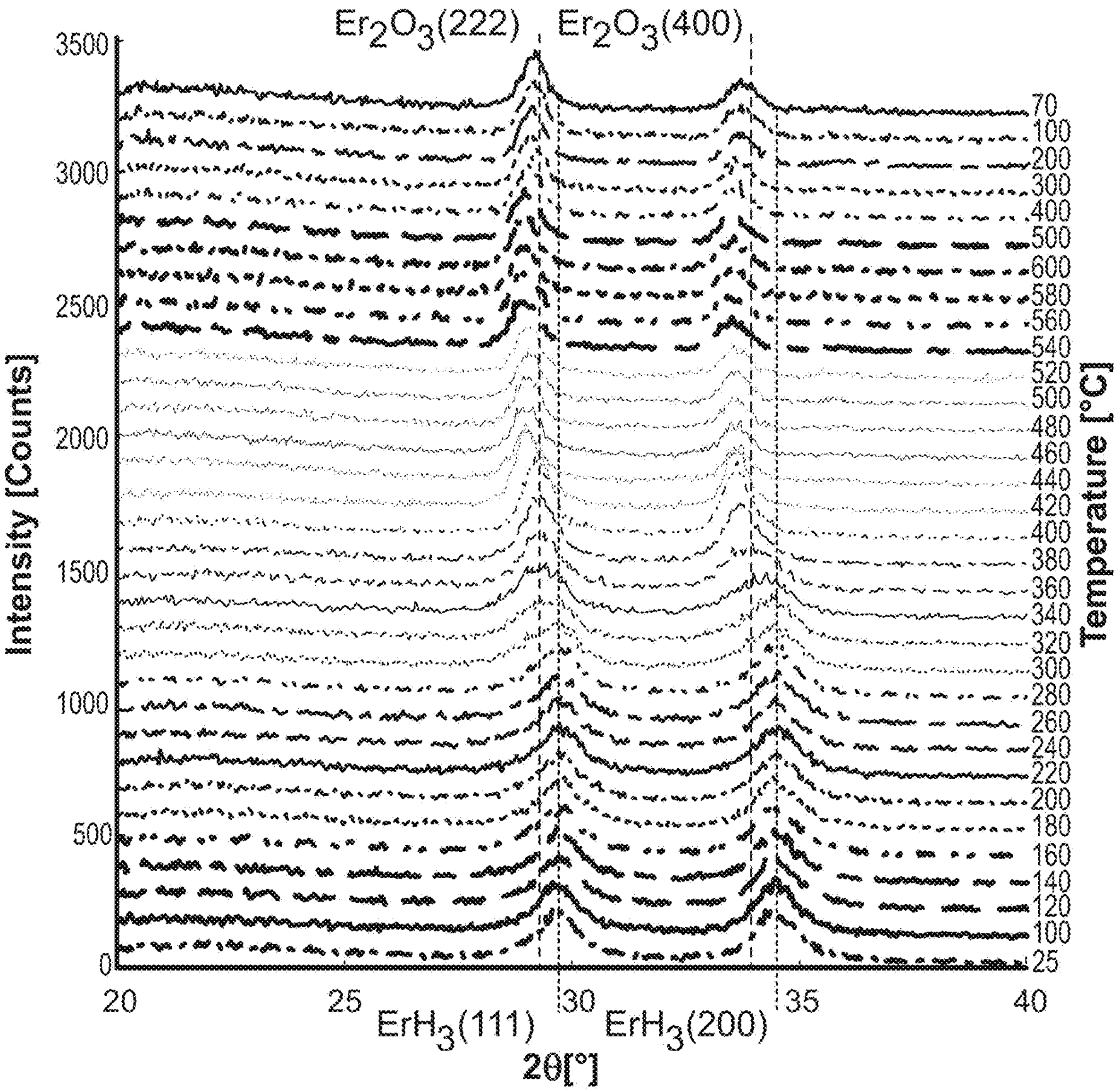
FIG. 4 shows hot-stage X-ray diffraction (HS-XRD) patterns of $ErH_3$ conversion into $Er_2O_3$

Phase transformations underlying $ErH_3$/$Er_2O_3$ switch operation were investigated by hot-stage X-ray diffraction (HS-XRD). The method can distinguish phase mixtures, if they exist, provided there are unique, detectable signatures for each constituent. Example diffraction patterns obtained from sputter deposited erbium hydride films are shown in FIG. 4. Sample heating was continued to 600° C. then cooled while continuing to capture diffractograms. Each diffractogram was captured during brief, isothermal pauses at each listed temperature. The archived diffraction patterns for the $ErH_3$ (111) and $ErH_3$ (200) peaks are shown as dotted lines at the bottom of the plot and those for the $Er_2O_3$ (222) and $Er_2O_3$ (400) peaks are shown as dashed lines at the top of the plot. The observed diffraction peaks correspond to the most intense reflections for each phase listed.

The as-deposited film diffractograms match that of a $ErH_3$ structure. See M. Tkacz and T. Palasyuk, *J. Alloys Compd.* 446, 593 (2007). The formation of an $Er_2O_3$ phase is observed first at ~300° C. There exists a two-phase regime at temperatures above 300° C. and below 350° C. that persists over the 30 min. total dwell time. The oxide remains stable up to the maximum test temperature (600° C.). Additionally, this oxide phase is stably maintained when the temperature is lowered. The film does not revert to a metal hydride consistent with thermodynamics.

The oxide formation onset temperature suggests that only a small phase fraction, compared to the XRD detector limit, is necessary to induce conductivity changes in a four-point probe measurement. From the diffraction data in FIG. 4, a rate constant was determined with an activation energy of 290 kJ/mole of $ErH_3$ for the REDOX reaction. Kinetic information was derived based on isothermal holds (350, 360, 370° C.) for three separate films. The films were heated in-situ via HS-XRD with constant monitoring of the 32° and 36° 2θ range at the hold temperature.

This allowed evaluation of the $ErH_3$ (200) peak at 34.6° 2θ to seamlessly transition to $Er_2O_3$ as denoted by the detection of the (400) peak at 34.0° 2θ. The contour plots generated from these experiments reveal a straightforward and linear shift of the $ErH_3$ (200) peak location to the $Er_2O_3$ (400) peak location. Hence, a simple slope determination of this shift in peak position with time enabled rate constant derivation at each temperature. Tabulated values of the measured rate constants are provided in Table 1.

TABLE 1

Rate constants for $Er_2O_3$ formation in air taken from HS-XRD.

| Temperature [° C.] | Rate Constant [$s^{-1}$] |
|---|---|
| 350 | $3.0 \times 10^{-4}$ |
| 360 | $1.0 \times 10^{-3}$ |
| 370 | $1.7 \times 10^{-3}$ |

Figure 5A:
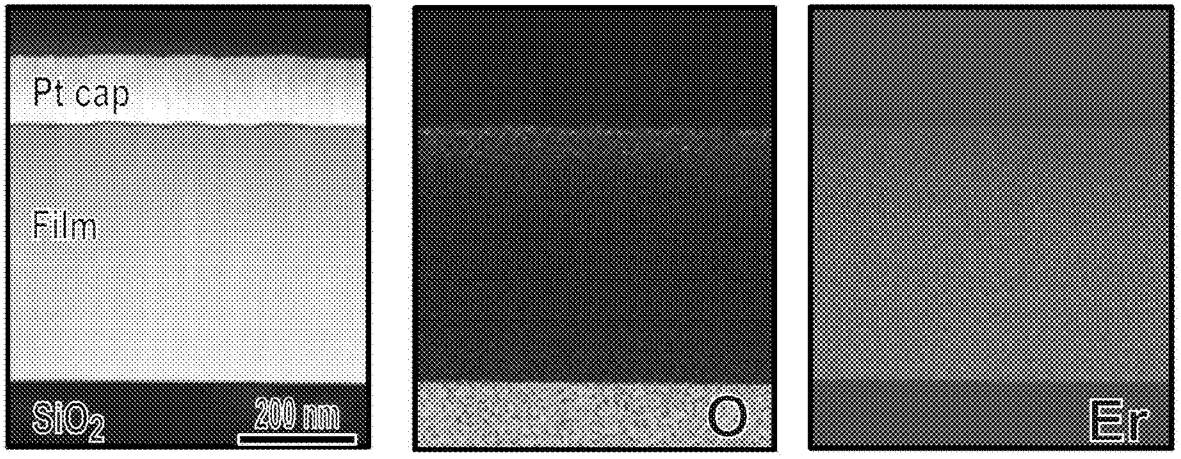
FIG. 5A shows a scanning transmission electron micrograph (STEM) and energy dispersive spectroscopy (EDS) maps of partially oxidized $ErH_3$ thin films after a 15 min. dwell at 350° C. in air.

Additional characterization of the two-phase temperature regime was performed using cross-section scanning transmission electron microscopy (STEM). Using the information provided by in-situ XRD, a film was annealed in air for 15 min. at 350° C. The sample was heated for essentially half the anneal time (i.e., total dwell time) required for the diffraction pattern generated at the diffractometer's source beam penetration depth to show complete conversion into the oxide. It was then cooled and sectioned for electron microscopy study of phase fraction. A high-angle annular dark field image (HAADF) and EDS maps showing the O and Er distribution are provided in FIG. 5A.

Figure 5B:
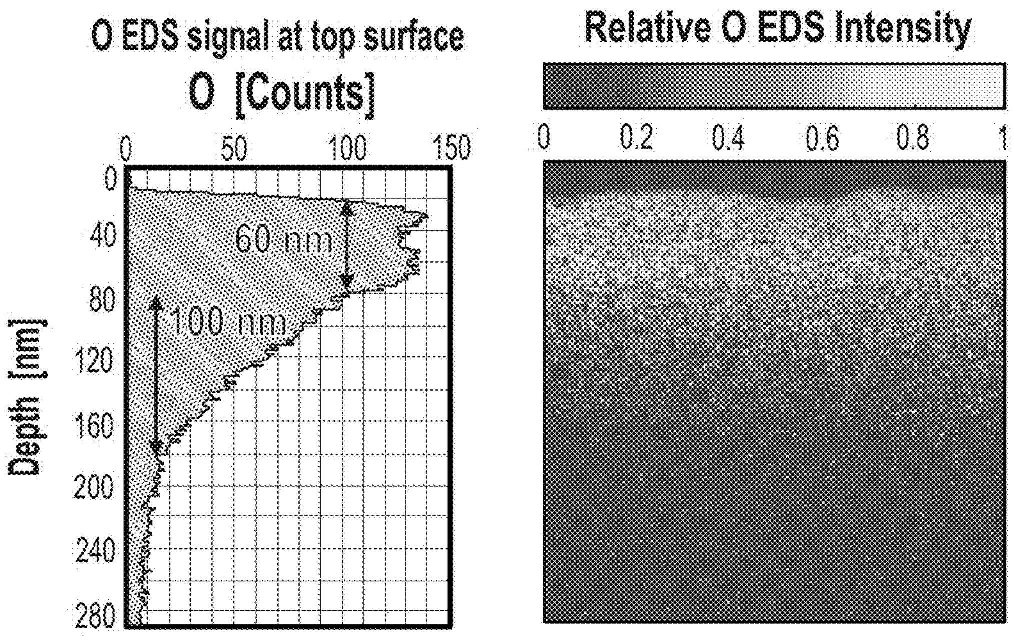
FIG. 5B is an EDS map showing oxide at the top of the film followed by a concentration gradient two-phase mixture.

As expected, the STEM image shows a two-phase mixture where the sample is partially oxidized. It is apparent in the EDS maps that the oxide nucleates at the $ErH_3$/air interface and then penetrates the film. A closer look at the 0 counts in FIG. 5B shows that the top 60 nm of film has uniformly oxidized followed by a two-phase regime that extends another 100 nm into the $ErH_3$. Voids are not observed in the switch material at the reaction interface in FIG. 5A. A thin surface oxide is consistent with the four-point probe measurements showing the sheet resistance in an open state at 250° C. while the XRD still detects the $ErH_3$ beneath the oxidized layer.

Figure 6A:
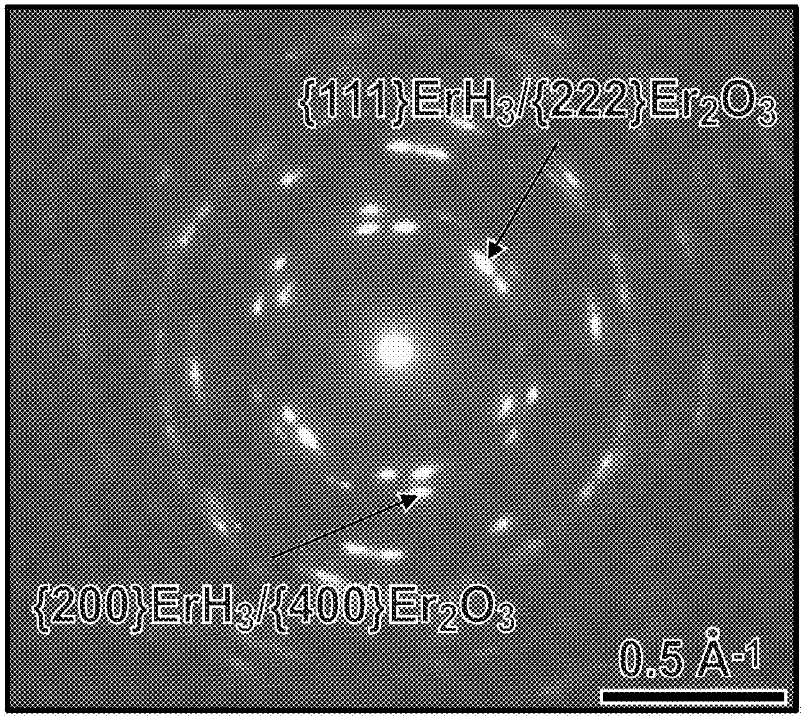
FIG. 6A is a selected area diffraction pattern from the center of an $ErH_3$ film annealed at 350° C. for 15 min.
Figure 6B:
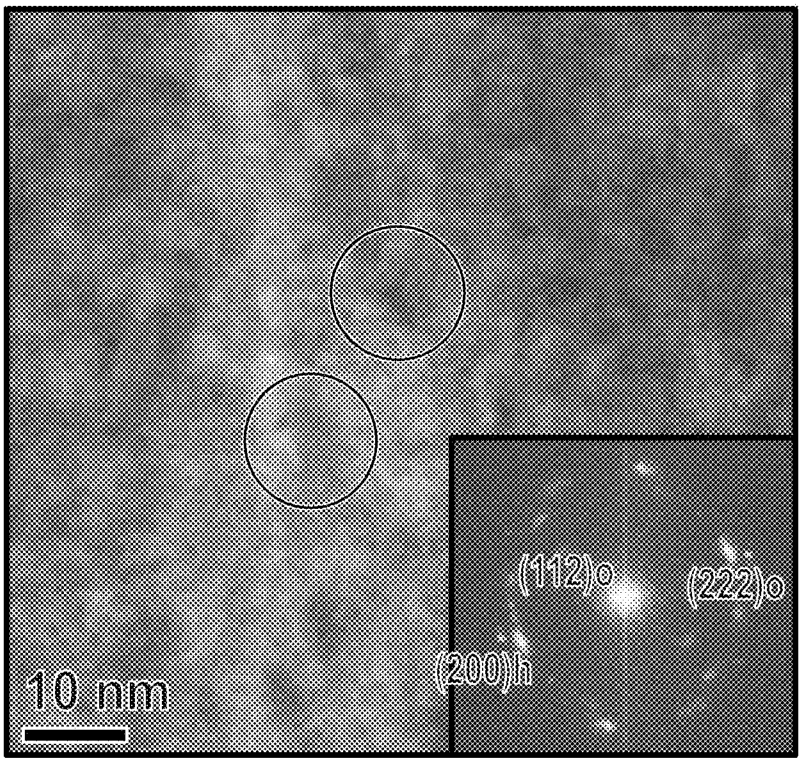
FIG. 6B is a high-resolution STEM image filtered to isolate oxide lattice frequencies from showing $Er_2O_3$ nanograins (indicated by circles) in the middle of the film.

Selected area diffraction patterns from a 10 μm diameter aperture at the center of the film (i.e., well below the surface oxidation front) in FIG. 6A show reflections consistent with the cubic $ErH_3$ phase. However, the diffraction patterns are complicated by additional reflections at <0.3 $Å^{-1}$ that do not correspond to d-spacings in $ErH_3$. Additionally, the (111) and (200) reflections in the hydride are Scherrer broadened such that they cannot be distinguished from the (222) and (400) lattice planes in the oxide, respectively. To determine whether the low angle reflections originate from the presence of oxide or Moire fringes of overlapping hydride grains, a bandpass filter was applied to a high-resolution STEM image of the film center in FIG. 6B. A fast Fourier transform of the HAADF image is also shown in the figure. Within the image, nanograins are circled and visible with lattice spacings corresponding to $Er_2O_3$. The presence of these nanograins embedded within a hydride matrix suggests that there is some oxide formation from the interstitial O that was present in the film before heating but could not covalently bond with the Er until the H was reduced and desorbed.

Solid-State $ErH_3$/$Er_2O_3$ Switch Performance

Figure 7:
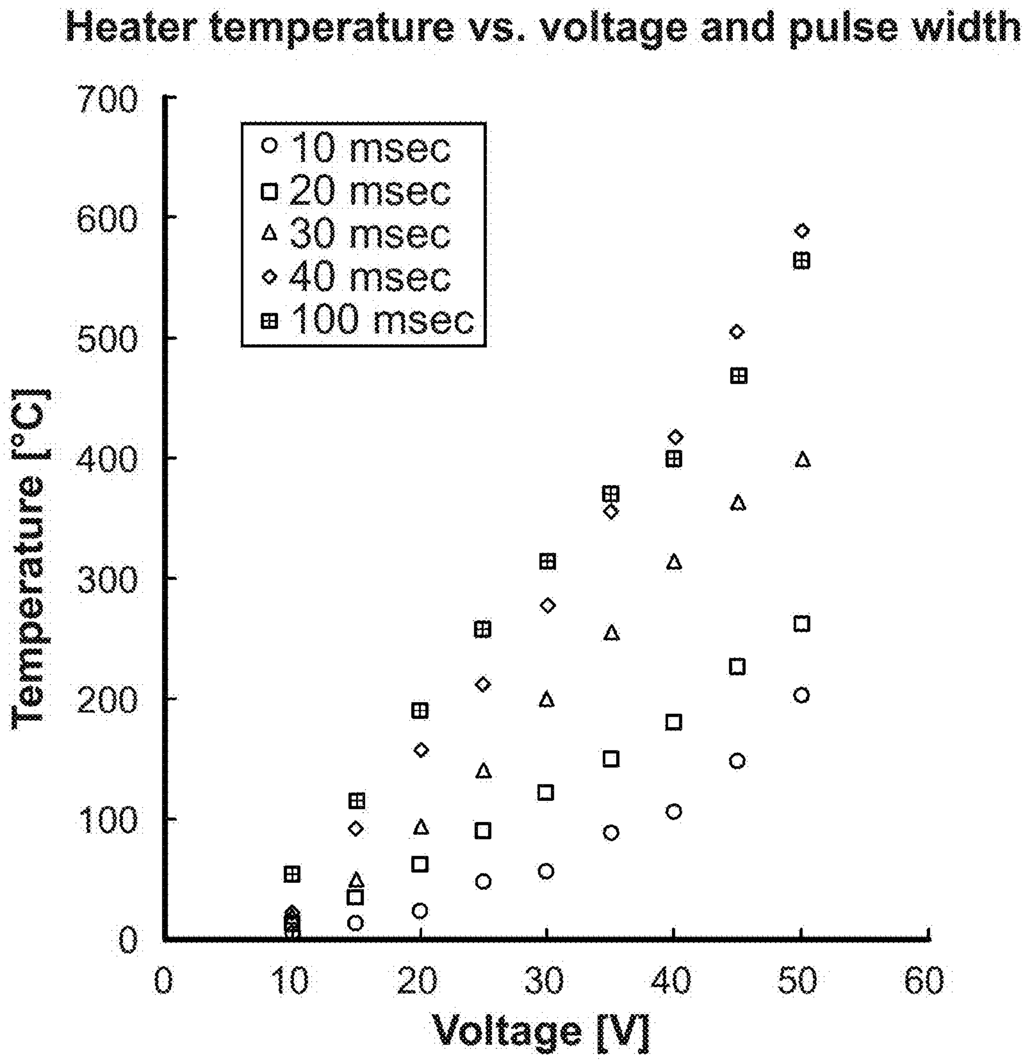
FIG. 7 is a graph of heater temperatures achieved as a function of voltage and pulse width for an on-board heater. The reported temperatures were measured from Pt films deposited on to the switch material side of die.

Micro-heater temperature calibrations were first performed without the active switch material integrated into the devices. Temperatures for the test die were calibrated as a function of voltage and pulse duration by high-speed thermal imaging. Calibration tests utilized approximately 500 nm-thick Pt films deposited on electrodes. Pt was chosen because of its known emissivity (0.15) which helps reduce the uncertainty associated with temperature measurements. See S. Deemyad and I. F. Silvera, *Rev. Sci.* 79(8), 086105 (2008). Due to the thermal camera integration time, temperatures reported in FIG. 7 represent a final temperature for a given voltage impulse. Pulse durations from 10-100 ms are listed in the legend. For each pulse duration, separate tests applied different voltages specified along the x axis.

Measured temperature increases with applied voltage exhibit an emergence in trend for a particular pulse duration. A maximum temperature near 600° C. was achieved as intended. Longer pulse durations lead to higher temperature for a fixed voltage up to 40 μs and then stabilizes to a constant dwell temperature thereafter. Consistent results were found through multiple tests.

After characterizing the isolated micro-heaters, normally closed $ErH_3$ films were deposited onto the front of the die shown in FIG. 1B and tested by thermal actuation. A current was driven through the micro-heaters and the change in resistance of the switch material was measured. Experiments were performed as a function of heater voltage at fixed time and of time at fixed voltage. The closed state resistance of the integrated switches of 27±1Ω is higher than the 3.4Ω calculated for the device geometry from the isolated film resistivity measurements. The difference in measured device and calculated hydride resistances suggests that the integrated switches have a contact resistance of 24.6±1Ω. The results are summarized in Tables 2 and 3.

TABLE 2

Switch resistance after a 250 ms pulse at different voltages.

| Device No. | Voltage [V] | Time [ms] | Starting Resistance [Ω] | Ending Resistance [Ω] |
|---|---|---|---|---|
| 1 | 30 | 250 | 26.6 | 214 |
| 2 | 35 | 250 | 27.2 | 100 |
| 3 | 40 | 250 | 26.7 | 114 |
| 4 | 40 | 250 | 26.7 | 1050 |
| 5 | 45 | 250 | 26.4 | Open, $1.3 \times 10^{13}$ * |
| 6 | 50 | 250 | 26.6 | Open, $1.3 \times 10^{13}$ * |

TABLE 3

Switch resistance after a 50 V pulse of different duration. * the ending resistance is an estimate based on the switch/electrode dimensions and resistivity.

| Device No. | Voltage [V] | Time [ms] | Starting Resistance [Ω] | Ending Resistance [Ω] |
|---|---|---|---|---|
| 1 | 50 | 40 | 27.9 | 27.9 |
| 2 | 50 | 100 | 27.5 | 530 |
| 3 | 50 | 110 | 27.4 | 4000 |
| 4 | 50 | 120 | 26.6 | $1.26 \times 10^{7}$ |
| 5 | 50 | 120 | 26.8 | 7500 |
| 6 | 50 | 120 | 27.5 | $1.32 \times 10^{4}$ |
| 7 | 50 | 120 | 27.0 | Open, $1.30 \times 10^{13}$ |
| 8 | 50 | 120 | 27.2 | $6.10 \times 10^{6}$ |
| 9 | 50 | 120 | 26.9 | $1.90 \times 10^{6}$ |
| 10 | 50 | 120 | 27.3 | $1.07 \times 10^{7}$ |
| 11 | 50 | 125 | 26.8 | Open, $1.3 \times 10^{13}$ * |
| 12 | 50 | 130 | 26.7 | Open, $1.3 \times 10^{13}$ * |
| 13 | 50 | 150 | 27.1 | Open, $1.3 \times 10^{13}$ * |
| 14 | 50 | 200 | 27.5 | Open, $1.3 \times 10^{13}$ * |
| 15 | 50 | 250 | 26.6 | Open, $1.3 \times 10^{13}$ * |

The results presented in Tables 2 and 3 indicate rapid switching of normally closed $ErH_3$ thermal switches. The film material is transformed to an open state when using a single 125 ms pulse and an applied 50 V to the heater. The starting resistance was consistently in the range 26-28Ω, demonstrating good deposition process repeatability across the die. The open state was estimated to have a resistance of ~$1.3 \times 10^{13}$Ω based on the switch/electrode geometrical dimensions and the resistivity (ρ=56 MΩ-m) determined from blanket film measurements.

A surface oxide growth model was employed to determine the kinetic properties of the $ErH_3/Er_2O_3$ switches. Within such a model, the conversion of hydride to oxide coincides with a thinning of the conductive sheet until growth reaches the substrate/film interface. Such a physical picture is consistent both with the STEM data and the rapid resistance contrast observed in the electrical data.

The governing kinetic equation is given as $$\frac{dt_{ox}}{dt} = \frac{k_s N_s}{M(1 + k_s/Dt_{ox})} \tag{1}$$

where the $1^{st}$ time derivative of the oxide thickness, $t_{ox}$, is a function of the number of Er atoms per unit volume, M; the concentration of O atoms at the surface or $ErH_3$ equal to the O solid solubility limit, $N_s$; the diffusivity of O in erbium hydride, D; and the rate of $Er_2O_3$ formation, $k_s$. The chemical reaction is assumed to be Arrhenius with temperature, T, as $$k_s = A_s \exp\left(\frac{-E_A}{RT}\right) \tag{2}$$

where $E_A$ is the activation energy, $A_s$ is an empirically derived constant, and R is the ideal gas constant. Similarly, D is Arrhenius in temperature as $$D = D_0 \exp\left(\frac{-E_\Gamma}{k_B T}\right) \tag{3}$$

with $E_\Gamma$ being the energy barrier to atomic site hopping, $D_0$ the diffusivity, and $k_B$ is Boltzmann's constant. The choice between R and $k_B$ is dependent upon dimensional analysis and the measured/calculated units of $E_A$ and $E_\Gamma$, respectively. Model input parameters and corresponding references are provided in Table 4. The model assumes that at reaction temperatures the diffusion of reduced H away from Er is orders of magnitude greater than the movement of O into the film subsurface. See R. R. Wixom et al., *J. Appl. Phys.* 103, 123708 (2008). Additionally, the values for $N_s$, $D_0$, and $E_\Gamma$ were taken from the intermediate $ErH_2$ dihydride phase under the assumption that the reaction front has kinetic properties like $ErH_2$ after desorbing the first H atom. The differential equation is solved iteratively with a timestep of 1 μs while determining temperature using a linear interpolation of the heater data in FIG. 7.

TABLE 4

Model input parameters for $ErH_3$ switching.

| Parameter | Value | Reference |
|---|---|---|
| M | $2.72 \times 10^{28}$ Er/m$^3$ | [1] |
| $N_s$ | $8.16 \times 10^{26}$ O/m$^3$ | [2] |
| $A_s$ | $3.64 \times 10^{14}$ m/s | This work |
| $E_A$ | $2.9 \times 10^{5}$ J/mol. $ErH_3$ | This work |
| $D_0$ | $10^{-7}$ m$^2$/s | [3] |
| $E_\Gamma$ | $1.91 \times 10^{-19}$ J | [3] |

[1] A. Jain et al., *APL Mater.* 1(1), 011002 (2013).
[2] C. S. Snow et al., *J. Nucl. Materials* 374, 147 (2008).
[3] R. R. Wixom et al., *J. Appl. Phys.* 103, 123708 (2008).

Figure 8A:
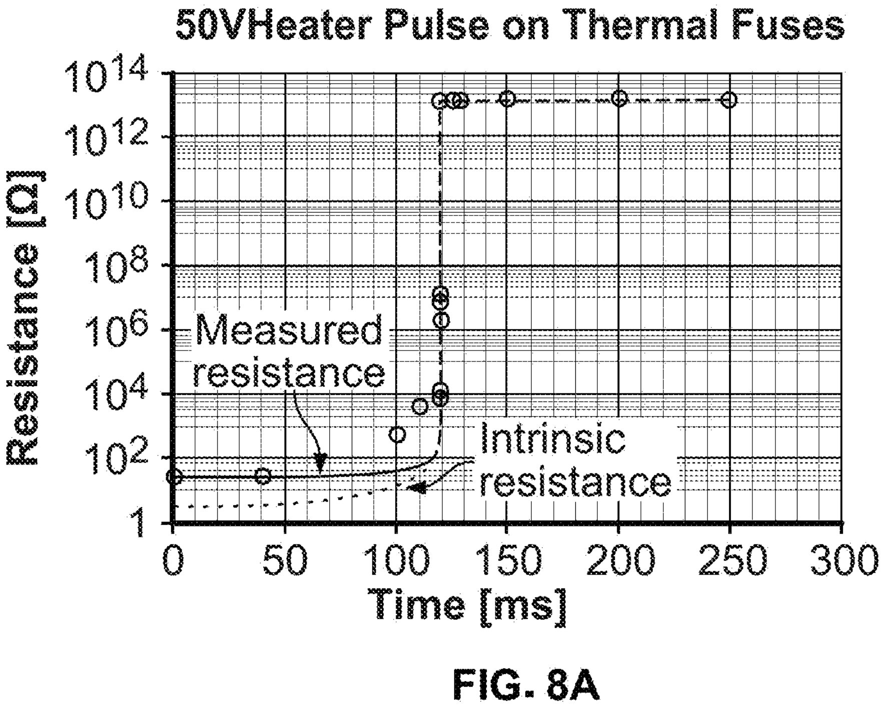
FIG. 8A is a graph of resistance versus time and a model fit to the experimental switching data of normally closed $ErH_3 \rightarrow Er_2O_3$ switches with heaters pulsed at 50 V.

Model fits to experimental data of $ErH_3/Er_2O_3$ switching are shown in FIG. 8A. The plot shows the expected change in switch resistance from the surface oxide growth model compared to the experimental data measuring the change in switch resistance after a 50 V pulse at varied pulse duration in Table 3. The tabulated data is used to determine the kinetic constant $A_s$. With a single value for $A_s$, which appears in both the numerator and denominator of the growth differential, the surface oxide growth model captures the abrupt rise in resistance at 120 ms. However, the model only considers oxide formation from a planar growth front into the film and thus does not capture the small rise in resistance observed just before the material switches. The 100s to 1000s of Ω resistance observed between 100 ms and 120 ms could be attributed to the bulk oxidation of the ~2-3% O present in as-deposited $ErH_3$ films if it is present. See C. S.

Snow et al., *J. Nucl. Materials* 374, 147 (2008). The observed resistance increase is comparable to that seen in other metal/metal oxide composites. See L. M. P. Ferreira et al., *Adv. Mater. Process. Technol.* 2, 165 (2016). At 100 ms of a 50 V pulse, the switch is above the H reduction temperature but is kinetically limited by surface oxide penetration to the film/substrate interface. The same condition occurs for the 250 ms pulses operated at 30 V, 35 V, and 40 V as listed in Table 2 where the same 1-2 orders of resistance increase is observed.

Figure 8B:
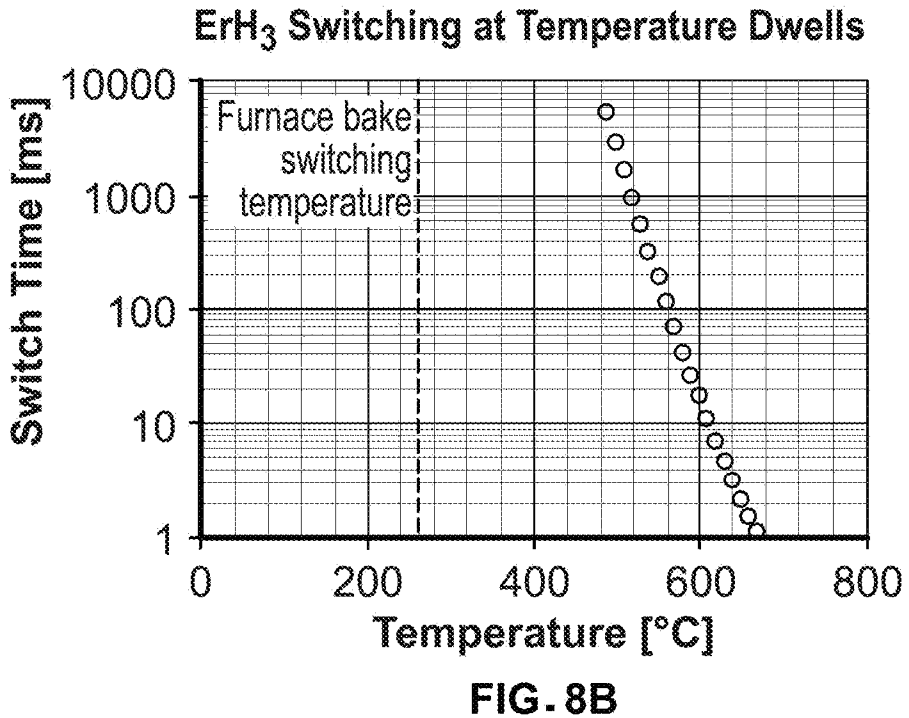
FIG. 8B is graph of switch times of normally closed $ErH_3+Er_2O_3$ devices at constant temperature dwells.

Switching times as a function of dwell temperature were calculated based on the calibration of kinetic constants and shown in FIG. 8B. The kinetic limitations of a surface oxidation mechanism cause switching temperatures of ~600° C. to require ~10 ms of heating even when the furnace anneal switching temperature (an approximation for time independent switching) is at least 350° C. lower. Although near their limit, the micro-heaters can attain ~600° C. Thus, it may be possible to achieve 1 ms switch times with slightly modified heaters or through direct integration of the normally closed switch materials as sensors of an external heat source that exceeds 680° C.

The present invention has been described as irreversible, normally closed, solid-state thermal switch. It will be understood that the above description is merely illustrative of the applications of the principles of the present invention, the scope of which is to be determined by the claims viewed in light of the specification. Other variants and modifications of the invention will be apparent to those of skill in the art.

The invention claimed is:

1. An irreversible, normally closed, solid-state thermal switch, comprising:

a rare-earth metal hydride thin film disposed between two electrodes, and a heat source configured to heat the rare-earth metal hydride thin film to a transformation temperature, whereby the rare-earth metal hydride is at least partially transformed from an electrical conductor to an electrical insulator.

2. The irreversible, normally closed, solid-state thermal switch of claim 1, wherein the rare-earth metal hydride is at least partially transformed to a metal oxide at the transformation temperature.

3. The irreversible, normally closed, solid-state thermal switch of claim 1, wherein the rare-earth metal hydride comprises erbium hydride.

4. The irreversible, normally closed, solid-state thermal switch of claim 1, wherein the heat source comprises a micro-heater.

5. The irreversible, normally closed, solid-state thermal switch of claim 1, wherein heat source comprises a thermal environment.

* * * * *